United States Patent
Marcoon

(10) Patent No.: US 7,744,681 B2
(45) Date of Patent: Jun. 29, 2010

(54) ANTIMICROBIAL FILTRATION ARTICLE

(75) Inventor: Ken Marcoon, Charleston, SC (US)

(73) Assignee: MVP Textiles & Apparel, Inc., Charleston, SC (US)

( * ) Notice: Subject to any disclaimer, the term of this patent is extended or adjusted under 35 U.S.C. 154(b) by 0 days.

(21) Appl. No.: 12/401,128

(22) Filed: Mar. 10, 2009

(65) Prior Publication Data

US 2009/0232962 A1   Sep. 17, 2009

Related U.S. Application Data

(62) Division of application No. 11/690,037, filed on Mar. 22, 2007, now Pat. No. 7,520,923.

(51) Int. Cl.
*B01D 46/00* (2006.01)
(52) U.S. Cl. .......... 95/285; 55/524; 55/DIG. 5; 95/287; 96/226
(58) Field of Classification Search .......... 55/486, 55/524, DIG. 5; 95/287; 96/226, 227, 285; 128/200.24, 205.29, 206.13, 206.19, 206.21, 128/206.28, 207.11, 207.13
See application file for complete search history.

(56) References Cited

U.S. PATENT DOCUMENTS

| | | | |
|---|---|---|---|
| 1,319,763 A | 10/1919 | Drew | |
| 2,374,754 A * | 5/1945 | Kreidl et al. | 424/404 |
| 2,813,059 A | 11/1957 | Davis et al. | |
| 3,092,552 A * | 6/1963 | Romans | 424/404 |
| 3,710,948 A | 1/1973 | Sexton | |
| 3,761,590 A | 9/1973 | Fox | |
| 3,779,244 A | 12/1973 | Weeks | |
| 3,802,429 A | 4/1974 | Bird | |
| 4,042,737 A | 8/1977 | Forsgren et al. | |
| 4,197,100 A | 4/1980 | Hausheer | |
| 4,600,002 A | 7/1986 | Maryyanek et al. | |
| 4,677,143 A | 6/1987 | Laurin | |
| 4,798,676 A | 1/1989 | Matkovich | |
| 4,856,509 A | 8/1989 | Lemelson | |
| 4,883,052 A | 11/1989 | Weiss et al. | |
| 4,902,503 A | 2/1990 | Umemura | |

(Continued)

FOREIGN PATENT DOCUMENTS

JP   8071029   3/1996

(Continued)

OTHER PUBLICATIONS

Francolini, I. et al., Feb. 2006, Novel metal-polyurethane complexes with enhanced antimicrobial activity, *Macromolecular Rapid Communications*, vol. 27, No. 4, pp. 233-237.

(Continued)

*Primary Examiner*—Duane Smith
*Assistant Examiner*—Sonji Turner
(74) *Attorney, Agent, or Firm*—Hunton & Williams LLP

(57) ABSTRACT

The present invention relates generally to a filtration article, such as a protective facemask, a method for using a filtration article, and a method for preparing a filtration article. In particular, the invention relates to a protective facemask that cost-effectively offers a broad spectrum of antimicrobial protection through the use of fibers treated with one or more oligodynamic metal and/or salt of an oligodynamic metal.

13 Claims, 2 Drawing Sheets

U.S. PATENT DOCUMENTS

| | | | |
|---|---|---|---|
| 5,468,738 A | 11/1995 | Okabayashi | |
| 5,486,410 A | 1/1996 | Groeger et al. | |
| 5,525,136 A | 6/1996 | Rosen | |
| 5,607,683 A | 3/1997 | Capelli | |
| 5,706,804 A | 1/1998 | Baumann et al. | |
| 5,709,870 A | 1/1998 | Yoshimura et al. | |
| 5,747,053 A | 5/1998 | Nashimoto | |
| 5,792,793 A | 8/1998 | Oda | |
| 5,804,295 A | 9/1998 | Braun et al. | |
| 5,817,325 A | 10/1998 | Sawan | |
| 5,849,311 A | 12/1998 | Sawan | |
| 5,883,026 A | 3/1999 | Reader et al. | |
| 5,888,527 A | 3/1999 | Nashimoto et al. | |
| 5,906,677 A | 5/1999 | Dudley | |
| 6,036,738 A | 3/2000 | Shanbrom | |
| 6,045,820 A | 4/2000 | Messier | |
| 6,063,170 A | 5/2000 | Diebert | |
| 6,183,932 B1 | 2/2001 | Asami | |
| 6,303,282 B1 | 10/2001 | Naruse | |
| 6,337,170 B1 | 1/2002 | Naruse | |
| 6,514,306 B1 | 2/2003 | Rohrbach et al. | |
| 6,583,176 B2 | 6/2003 | Arata | |
| 6,623,715 B2 | 9/2003 | Hendricks et al. | |
| 6,681,765 B2 | 1/2004 | Wen | |
| 6,797,278 B2 | 9/2004 | Jackson | |
| 6,827,764 B2 | 12/2004 | Springett et al. | |
| 6,838,095 B2 | 1/2005 | Newman | |
| 6,872,241 B2 | 3/2005 | Soane et al. | |
| 6,897,349 B2 | 5/2005 | Gibbins et al. | |
| 6,905,711 B1 | 6/2005 | Tullo et al. | |
| 6,923,990 B2 | 8/2005 | Capelli | |
| 6,951,833 B2 | 10/2005 | O'Neil | |
| 6,989,157 B2 | 1/2006 | Gillis | |
| 7,044,993 B1 | 5/2006 | Bolduc | |
| 7,287,650 B2 | 10/2007 | Koslow | |
| 2002/0025344 A1 | 2/2002 | Newman | |
| 2002/0123523 A1 | 9/2002 | Arata | |
| 2003/0176827 A1 | 9/2003 | Chandra et al. | |
| 2003/0186955 A1 | 10/2003 | Vange | |
| 2003/0191204 A1 | 10/2003 | Hermann et al. | |
| 2003/0198689 A1 | 10/2003 | Arata | |
| 2003/0205137 A1 | 11/2003 | Bolduc | |
| 2003/0207954 A1 | 11/2003 | Hermann et al. | |
| 2003/0216483 A1 | 11/2003 | Hermann et al. | |
| 2004/0009964 A1 | 1/2004 | Capelli | |
| 2004/0016345 A1 | 1/2004 | Springett et al. | |
| 2004/0110738 A1 | 6/2004 | Gillis | |
| 2004/0214809 A1 | 10/2004 | Capell | |
| 2004/0217049 A1 | 11/2004 | Bayer et al. | |
| 2005/0048124 A1 | 3/2005 | Sarangapani | |
| 2005/0061678 A1 | 3/2005 | Holladay | |
| 2006/0045899 A1 | 3/2006 | Sarangapani | |
| 2006/0135941 A1 | 6/2006 | Porto | |
| 2006/0141015 A1 | 6/2006 | Tessier | |
| 2006/0154540 A1 | 7/2006 | Hilfenhaus | |
| 2006/0219641 A1* | 10/2006 | Kepner et al. | 210/723 |
| 2006/0234899 A1 | 10/2006 | Nekmard et al. | |
| 2006/0254427 A1 | 11/2006 | Trend et al. | |
| 2007/0044801 A1 | 3/2007 | Mathis et al. | |

FOREIGN PATENT DOCUMENTS

| | | |
|---|---|---|
| JP | 2000/154340 | 6/2000 |
| WO | WO 03/090799 | 11/2003 |
| WO | WO 2004/056403 | 7/2004 |
| WO | WO 2004/056404 | 7/2004 |

OTHER PUBLICATIONS

Morrison, M.L. et al., Jan. 2006, Electrochemical and antimicrobial properties of diamondlike carbon-metal composite films, *Diamond and Related Materials*, vol. 15, No. 1, pp. 138-146.

Tessier, D. et al., 2005, Antimicrobial fabrics coated with nano-sized silver salt crystals, *NSTI Nanotech 2005*, pp. 762-764 Nano Science and Technology Institute, Cambridge, MA (publisher). NSTI Nanotechnology Conference and Trade Show, May 8-12, 2005, Anaheim, CA.

Song, J. S. et al., May 2005, Surface modification of silicone rubber by ion beam assisted deposition (IBAD) for improved biocompatibility, *Journal of Applied Polymer Science*, vol. 96, No. 4, pp. 1095-1101.

Furno F. et al., Silver nanoparticles and polymeric medical devices: a new approach to prevention of infection? *Journal of Antimicrobial Chemotherapy*, vol. 54, No. 6, pp. 1019-1024.

PCT International Search Report (PCT/US08/03761) mail date Nov. 19, 2008.

* cited by examiner

ANTIMICROBIAL FILTRATION ARTICLE

This application is a divisional of U.S. Ser. No. 11/690,037, filed Mar. 22, 2007, now U.S. Pat. No. 7,520,923 the disclosure of which is hereby incorporated by reference in its entirety.

FIELD OF THE INVENTION

The present invention relates generally to a filtration article, such as a facemask, the use of a filtration article, and a method for preparing a filtration article. In particular, the invention relates to a filtration article that offers antimicrobial protection through the use of fibers treated with one or more oligodynamic metal and/or salt of an oligodynamic metal.

BACKGROUND OF THE INVENTION

Due to the risk of infection by pathogens, such as airborne pathogens, the use of protective facemasks has become part of standard practice in many settings, such as in hospitals and other medical facilities, by those who come into contact with patients. Protective facemasks are also widely used by others, such as medical professionals and other healthcare workers, for example, paramedics and emergency medical technicians, who interact with patients outside formal treatment settings. Typically, a facemask is worn by the medical professional or other healthcare worker to protect both the wearer and patient from transmission of any infective agent. For example, the facemask can be used to protect a healthcare worker from an infected patient. Likewise, the facemask can be used to protect a vulnerable patient from exposure to pathogens, for example a patient undergoing a surgical procedure or an immunocompromised patient. As such, protective facemasks are an essential component of a healthcare worker's personal protective equipment. Of course, it may also be beneficial for certain patients or individuals who are immunocompromised or particularly susceptible or vulnerable to infection to also wear such protective facemasks. Protective facemasks may also be useful for distribution to the general public in cases of epidemics or pandemics, as well as in cases of any widespread release of pathogens or agents containing pathogens, whether intentional or unintentional. An effective facemask represents a critical barrier in preventing the transmission of harmful infections.

Various designs and configurations for facemasks have been previously proposed. One class of masks uses a filter network to trap the pathogens. These facemasks include the surgical type masks commonly worn in hospitals. One example is described in U.S. Pat. No. 7,044,993 to Bolduc entitled "Microbicidal air filter." Bolduc discloses a system that employs an immobilization network of fibers having antimicrobial agents incorporated and molecularly bonded into its structure. Another class of masks include those that employ filter canisters to trap the pathogens. One example is described in U.S. Pat. No. 6,681,765 to Wen entitled "Antiviral and antibacterial respirator mask." Wen discloses a system that employs a filtration apparatus containing both an active stage and passive stage filter in the mask.

The aforesaid designs and other previously proposed facemasks suffer from a number of important shortcomings. For example, some designs may only immobilize and not neutralize the airborne pathogens. Thus, removal of a facemask after use may cause pathogens not completely immobilized to be dispersed into the air immediately around the user. The pathogen may cause an infection if inhaled or may pose a contact transmission risk via the hands during the disposal process. In addition, some of the designs incorporate viscous material into the filter material to capture particulate material, while other designs incorporate complex arrangements of filters inside cartridges. These designs may be impractical for use in facemasks. For example, they may be too complex and cumbersome to routinely use as well as too expensive. In other cases, material harmful to humans, such as fiberglass, iodine, or chlorine, are used as part of the filter medium. Another facemask design uses antibacterial agents that freely detach from fibers of the facemask. These designs have the problem of a rapid loss of their antibacterial activity upon cleaning or washing thereof.

As is apparent from the foregoing, all of the previously proposed techniques to retain and neutralize microbes are characterized to some degree by deficiencies. Accordingly, there is a considerable need for an improved antimicrobial facemask. In particular, there is a need for an antimicrobial facemask that is both effective, safe, comfortable, durable, easy to use and store and relatively inexpensive to produce.

SUMMARY OF THE INVENTION

An embodiment of the present invention provides a filtration article comprising: an air permeable filtration layer comprising fibers treated with one or more oligodynamic metal and/or salt of an oligodynamic metal; an air permeable support layer operatively associated with said filtration layer, said support layer being configured to fit over the nose and mouth of a wearer; and an attachment element to secure said filtration article to the wearer.

A further embodiment of the present invention provides a filtration article comprising: an air permeable filtration layer comprising fibers treated with one or more oligodynamic metal and/or salt of an oligodynamic metal, said filtration layer comprises a sufficient concentration of said one or more oligodynamic metal and/or salt of an oligodynamic metal to capture and kill microbes in a volume of air moving through said filtration layer; an air permeable support layer operatively attached to said filtration layer, said support layer being configured to fit over the nose and mouth of a wearer; and an attachment element to secure said filtration article to the wearer.

An even further embodiment of the present invention provides a filtration article comprising: an air permeable filtration layer comprising fibers treated with one or more oligodynamic metal and/or salt of an oligodynamic metal, wherein the concentration of said one or more oligodynamic metal and/or salt of an oligodynamic metal in the filtration layer is between about 10 parts per million to about 10,000 parts per million; an air permeable support layer operatively attached to said filtration layer, said support layer being configured to fit over the nose and mouth of a wearer; and an attachment element to secure said filtration article to the wearer.

A still further embodiment of the present invention provides a method of preparing a filtration article comprising: treating fibers with one or more oligodynamic metal and/or salt of an oligodynamic metal; incorporating said fibers into an air permeable filtration layer, said filtration layer being operatively associated with an air permeable support layer configured to fit over the nose and mouth of a wearer.

Another embodiment of the present invention provides a filtration article prepared by the process comprising: treating fibers with one or more oligodynamic metal and/or salt of an oligodynamic metal; and incorporating said fibers into an air permeable filtration layer, said filtration layer operatively associated to an air permeable support layer configured to fit over the nose and mouth of an wearer.

A further embodiment of the present invention provides a filtration article comprising: an air permeable filtration layer comprising fibers treated with silver or silver chloride and hydrophilic foam, wherein the concentration of said fibers in said filtration layer is between about 100 parts per million to about 2,000 parts per million and said fibers are about 0.5 mm in diameter; an air permeable support layer operatively associated with said filtration layer, said support layer being configured to fit over the nose and mouth of a wearer; and an attachment element to secure said filtration article to the wearer.

An even further embodiment of the present invention provides a method of preparing a filtration article comprising: treating fibers with silver or silver chloride; incorporating said fibers into an air permeable filtration layer comprising hydrophilic foam, wherein the concentration of said fibers in said filtration layer is between about 100 parts per million to about 2,000 parts per million and said fibers are about 0.5 mm in diameter; and operatively associating said filtration layer with an air permeable support layer and an attachment element, said support layer configured to fit over the nose and mouth of a wearer and said attachment element configured to secure said filtration article to the wearer.

A still further embodiment of the present invention provides a filtration article prepared by the process comprising: treating fibers with silver or silver chloride; incorporating said fibers into an air permeable filtration layer comprising hydrophilic foam, wherein the concentration of said fibers in said filtration layer is between about 100 parts per million to about 2,000 parts per million and said fibers are about 0.5 mm in diameter; and operatively associating said filtration layer with an air permeable support layer and an attachment element, said support layer configured to fit over the nose and mouth of a wearer and said attachment element configured to secure said filtration article to the wearer.

DETAILED DESCRIPTION OF THE INVENTION

For the purposes of promoting an understanding of the embodiments described herein, reference will be made to various embodiments and specific language will be used to describe the same. The terminology used herein is for the purpose of describing particular embodiments only, and is not intended to limit the scope of the present invention. As used throughout this disclosure, the singular forms "a", "an", and "the" include plural reference unless the context clearly dictates otherwise.

As used herein, the term "microbe" or "microbial" is intended to mean microorganisms including, but not limited to, bacteria, protozoa, viruses, molds, fungi, yeast and the like. The term "antimicrobial" is intended to mean the property of inhibiting, preventing, or destroying the growth or proliferation of microbes such as bacteria, protozoa, viruses, molds, fungi, yeast and the like. The term "neutralize" is intended to mean inhibiting, preventing, or destroying growth or proliferation.

The present invention provides a filtration article, such as facemask, that provides protection against transmission of microbial organisms, such as pathogens. The inventors unexpectedly discovered a filtration article that effectively retains and neutralizes a broad spectrum of pathogens. The filtration article incorporates a filtration layer that effectively retains and neutralizes a broad spectrum of pathogens by incorporating a relatively low concentration of one or more oligodynamic metal and/or salt of an oligodynamic metal into the layer. Although previously available facemasks are often unable to retain and/or neutralize greater than 95% of microbes, the filtration article in accordance with various embodiments of the present invention can retain and neutralize greater than 99% of microbes. Moreover, by using a low concentration of oligodynamic metal or oligodynamic metal salt, the cost of manufacturing the filtration article is relatively low. The present invention overcomes the deficiencies found in the previously available facemasks, including deficiencies such as overall effectiveness, relatively high cost of manufacture compared to effectiveness in retaining and neutralizing a broad spectrum of microbes, ease of use, comfort, durability and various other factors. For example, the filtration articles of the present invention do not impede flow of oxygen to the wearer or impede flow of carbon dioxide from the wearer. Further, the filtration articles of the present invention are comfortable to wear (even for long periods), easy to use, durable, compact and easily stored, readily disposable, safe and non-toxic.

Figure 1:
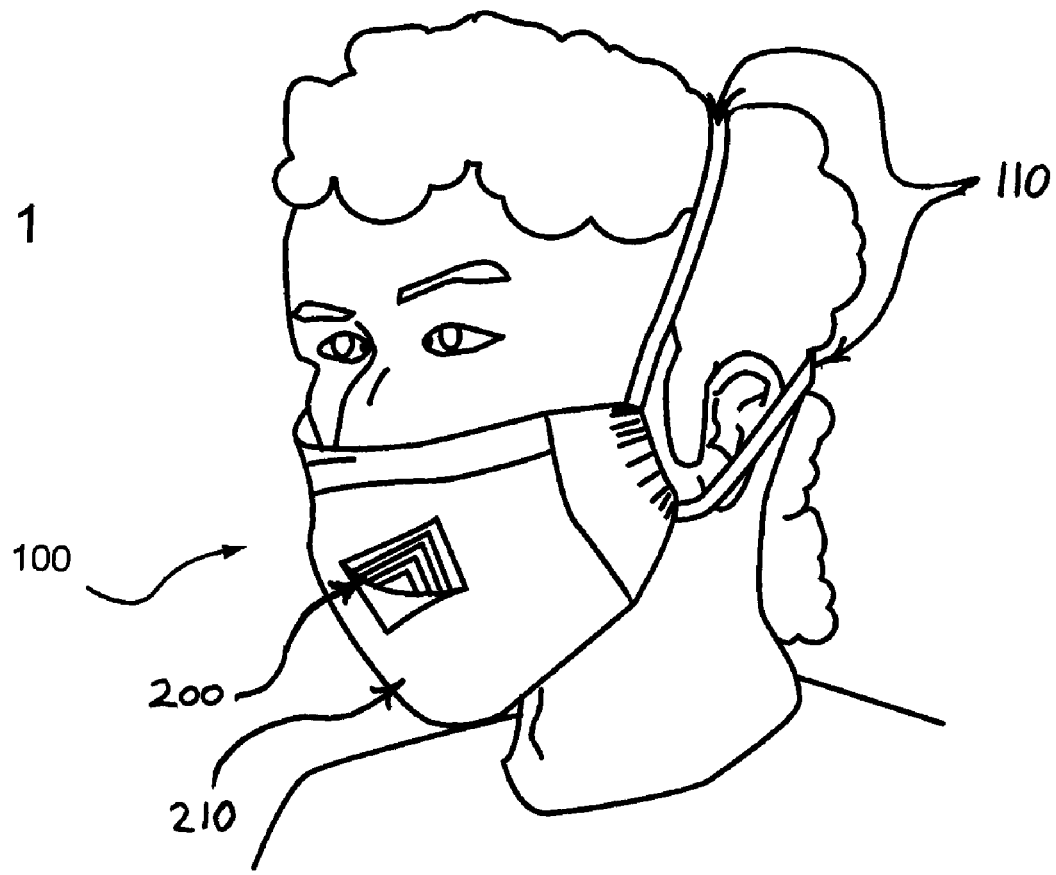
FIG. 1 provides an illustration of an antimicrobial flatfold facemask with a cutaway section showing the inner layers of the facemask according to an embodiment of the present invention.

Referring to FIG. 1, the details of one embodiment of the present invention is described in greater detail. The antimicrobial filtration article 100 is shown as a facemask similar to those generally worn by hospital workers designed to fit over the nose and mouth of a wearer. The antimicrobial filtration article has inner layers 200, an air permeable outer layer 210, and an attachment element 110. While the embodiment shown has a flatfold shape, the present invention is not limited to any particular style or configuration, and can include, but is not limited to, cone shape, duckbill shape, cup type, pocket type or interlining facemasks. Additionally, although the attachment elements 110 shown in this embodiment are straps for tying the facemask to the wearer, any suitable attachment element may be used. Examples of suitable attachment elements include, but are not limited to, hook and loop fasteners (such as VELCRO), straps, tabs, strings, elastic, buttons, ear loops, form fit, moldable attachment, adhesives, adhesive tabs, snaps or combinations thereof. The facemask according to the present invention may also incorporate other known facemask features including, but not limited to, visors, shields, beard covers, valves or combinations thereof.

Figure 2:
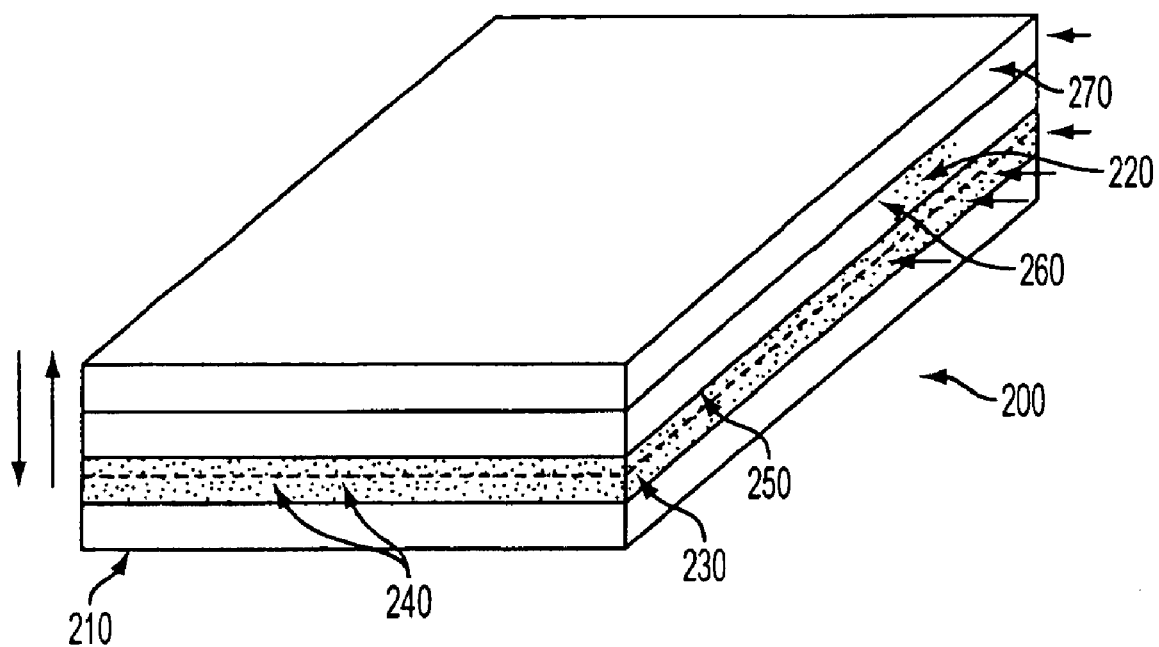
FIG. 2 provides an illustration of a cross-sectional view of an embodiment of the present invention.

Referring to FIG. 2, a cross-sectional view of the inner layers 200 in accordance with an embodiment of the present invention is provided. The inner layers 200 include an air permeable polymer foam layer 230 comprising fibers treated with one or more oligodynamic metal and/or salt of an oligodynamic metal 240, an air permeable layer 250, an inner filtration layer 260 comprising filter media 220, and an air permeable support layer 270. Also shown in FIG. 2 is the air permeable outer layer 210. The inventors found that by using fibers treated with one or more oligodynamic metal and/or salt of an oligodynamic metal in the filtration layer, the present invention was effective in retaining and neutralizing microbes. Additionally, the inventors found that the effectiveness of the filtration article to retain and neutralize microbes did not require a high concentration of the oligodynamic metal or oligodynamic metal salt in the filtration component. According to an embodiment, the total concentration of oligodynamic metal and/or oligodynamic metal salt in the filtration layer is between about 10 parts per million to about 10,000 parts per million. According to another embodiment, the total concentration of oligodynamic metal and/or oligodynamic metal salt in the filtration layer is between about 50 parts per million to about 5,000 parts per million. According to another embodiment, the total concentration of oligodynamic metal and/or oligodynamic metal salt in the filtration layer is between about 100 parts per million to about 2,000 parts per million. According to another embodiment, the total concentration of oligodynamic metal and/or oligodynamic metal salt used during the preparation of the filtration layer is between about 10 parts per million to about 10,000 parts per million. According to another embodiment, the total concentration of oligodynamic metal and/or oligodynamic metal salt used during the preparation of the filtration layer is between about 50 parts per million to about 5,000 parts per million. According to another embodiment, the total concentration of oligodynamic metal and/or oligodynamic metal salt used during the preparation of the filtration layer is between about 100 parts per million to about 2,000 parts per million.

The fibers in the filtration layer are treated with one or more oligodynamic metal, such as silver, and/or one or more salt of an oligodynamic metal, such as silver chloride, in accordance with various embodiments of the present invention. Any suitable process for treating a fiber with one or more oligodynamic metal and/or salt of an oligodynamic metal is contemplated by the present invention. Processes for treating fibers can include, but are not limited to, electroplating, electroless plating, vapor deposition, or combinations thereof. Suitable fibers treated with one or more oligodynamic metal and/or salt of one or more oligodynamic metal could be readily prepared by persons of skill in the art, based on the guidance provided herein.

According to another embodiment, silver treated fibers suitable for use with the filtration layer of the present invention include those manufactured as described in U.S. Pat. No. 4,042,737 and U.S. Pat. Application Publication No. 2003/0176827, which are hereby incorporated by reference.

The present invention contemplates the use of any suitable fibers. A person of skill in the art would readily recognize suitable fibers for use in the present invention, based upon the guidance provided herein. For example, fibers suitable for use with the filtration layer of the present invention can be made of materials including, but not limited to, cotton, cellulose, any polymeric material such as polyester, polyolefin, polyamide, polypropylene, acrylic, wool, regenerated cellulose or combinations thereof. According to an embodiment of the present invention, the fibers are about 0.3 mm to about 0.7 mm in diameter. According to another embodiment, the fibers are about 0.4 mm to about 0.6 mm in diameter. According to another embodiment, the fibers are about 0.5 mm in diameter.

Oligodynamic metals can include, but are not limited to, silver, mercury, copper, iron, lead, zinc, bismuth, gold, aluminum, platinum, palladium, iridium, tin, and antimony. Oligodynamic metal salts can include, but are not limited to, silver acetate, silver carbonate, silver chloride, silver citrate, silver cyanide, silver hydroxide, silver nitrate, silver nitrite, silver oxide, silver phosphate, silver sulfate, mercury acetate, mercury carbonate, mercury chloride, mercury citrate, mercury cyanide, mercury hydroxide, mercury nitrate, mercury nitrite, mercury oxide, mercury phosphate, mercury sulfate, copper acetate, copper carbonate, copper chloride, copper citrate, copper cyanide, copper hydroxide, copper nitrate, copper nitrite, copper oxide, copper phosphate, copper sulfate, iron acetate, iron carbonate, iron chloride, iron citrate, iron cyanide, iron hydroxide, iron nitrate, iron nitrite, iron oxide, iron phosphate, iron sulfate, lead acetate, lead carbonate, lead chloride, lead citrate, lead cyanide, lead hydroxide, lead nitrate, lead nitrite, lead oxide, lead phosphate, lead sulfate, zinc acetate, zinc carbonate, zinc chloride, zinc citrate, zinc cyanide, zinc hydroxide, zinc nitrate, zinc nitrite, zinc oxide, zinc phosphate, zinc sulfate, bismuth acetate, bismuth carbonate, bismuth chloride, bismuth citrate, bismuth cyanide, bismuth hydroxide, bismuth nitrate, bismuth nitrite, bismuth oxide, bismuth phosphate, bismuth sulfate, gold acetate, gold carbonate, gold chloride, gold citrate, gold cyanide, gold hydroxide, gold nitrate, gold nitrite, gold oxide, gold phosphate, gold sulfate, aluminum acetate, aluminum carbonate, aluminum chloride, aluminum citrate, aluminum cyanide, aluminum hydroxide, aluminum nitrate, aluminum nitrite, aluminum oxide, aluminum phosphate, aluminum sulfate, platinum acetate, platinum carbonate, platinum chloride, platinum citrate, platinum cyanide, platinum hydroxide, platinum nitrate, platinum nitrite, platinum oxide, platinum phosphate, platinum sulfate, palladium acetate, palladium carbonate, palladium chloride, palladium citrate, palladium cyanide, palladium hydroxide, palladium nitrate, palladium nitrite, palladium oxide, palladium phosphate, palladium sulfate, iridium acetate, iridium carbonate, iridium chloride, iridium citrate, iridium cyanide, iridium hydroxide, iridium nitrate, iridium nitrite, iridium oxide, iridium phosphate, iridium sulfate, tin acetate, tin carbonate, tin chloride, tin citrate, tin cyanide, tin hydroxide, tin nitrate, tin nitrite, tin oxide, tin phosphate, tin sulfate, antimony acetate, antimony carbonate, antimony chloride, antimony citrate, antimony cyanide, antimony hydroxide, antimony nitrate, antimony nitrite, antimony oxide, antimony phosphate, antimony sulfate, or combinations thereof. Suitable oligodynamic metals or oligodynamic metal salts could be readily obtained or prepared by persons of skill in the art based on the guidance provided herein.

The use of one or more oligodynamic metal and/or salt of an oligodynamic metal renders the filtration article of the present invention effective against a broad spectrum of microbes. Examples of microbes that the filtration article of the present invention are effective against include pathogens that can cause disease or illness in a human, such as various bacteria, viruses, protists, fungi, molds, yeasts, and the like, without limitation. The present invention contemplates pathogens that cause any type of infection, including nosocomial, opportunistic, hospital-acquired and/or post-surgical wound infections, without limitation. The present invention contemplates effectiveness against natural pathogens, recombinantly prepared pathogens or pathogens synthetically produced (e.g., manmade in a laboratory) by any means or any combination thereof, without limitation. The present invention also contemplates effectiveness against drug-resistant pathogens. The following is an exemplary list of specific pathogens that the present invention contemplates, without intending to be limited thereto, Parvovirus B19, Rhinovirus, Coxsackievirus, Echovirus, Hantavirus, Togavirus, Reovirus, Adenovirus, Orthomyxovirus-Influenza, Coronavirus, Morbillivirus, Varicella-zoster, Arenavirus-Junin, Arenavirus-Machupo, Arenavirus-Lassa, Filovirus-Marburg, Parainfluenza, Repiratory Syncytial Virus, Poxvirus-Variola, Poxvirus-Vaccinia, Monkeypox, Paramyxovirus, *Francisella tularensis, Bordetella pertussis, Mycoplasma pneumoniae, Chlamydia pneumoniae, Chlamydia psittaci, Klebsiella pneumoniae, Haemophilus influenzae, Coxiella burnetii, Pseudomonas pseudomallei, Actinomyces israelii, Legionella parisiensis, Legionella pneumophila, Cardiobacterium, Alkaligenes, Yersinia pestis, Pseudomonas cepacia, Enterobacter cloacae, Enterococcus, Neisseria meningitidis, Streptococcus faecalis, Streptococcus pyogenes, Mycobacterium kansasii, Mycobacterium tuberculosis, Streptococcus pneumoniae, Staphylococcus aureus, Staphylococcus epider-* mis, *Corynebacteria diphtheria, Clostridium tetani, Haemophilus parainfluenzae, Moraxella lacunata, Bacillus anthracis, Mycobacterium avium, Mycobacterium intracellulare, Acinetobacter, Moraxella catarrhalis, Serratia marcescens, Saccharomonospora viridis, Thermomonospora viridis, Micropolyspora faeni, Thermoactinomyces sacchari, Micromonospora faeni, Thermoactinomyces vulgaris, Nocardia asteroides, Nocardia brasiliensis, Nocardia caviae, Phialaphora parasitica, Phialaphora repens, Exophiala jeanselmei, Phialaphora hoffinannii, Phialaphora richardsiae, Pneumocystis carinii, Phialaphora mutabilis, Acremonium spp., Trichoderma harzianum, Oidiodendron tenuissimum, Geomyces pannorum, Histoplasma capsulatum, Paecilomyces variotii, Wallemia sebi, Emericella nidulans, Phoma spp., Pencillium brevicompactum, Penicillium chrysogenum, Penicillium citreonigrum, Penicillium commune, Penicillium corylophilum, Penicillium cyclopium, Penicillium expansum, Penicillium freii, Penicillium glabrum, Penicillium hordei, Penicillium olsonii, Penicillium polonicum, Penicillium rugulosum, Penicillium solitum, Aspergillus flavus, Aspergillus fumigatus, Aspergillus niger, Aspergillus versicolor, Absidia corymbifera, Coccidioides immitis, Trichoderma viride, Rhizomucor pusillus, Aureobasidium pullulans, Candida albicans, Chaetomium globosum, Cryptococcus albidus, Cryptococcus laurentii, Cryptococcus neoformans, Stachybotris atra, Stachybotris chartarum, Eurotium amstelodami, Eurotium herbariorium, Eurotium rubrum, Scopulariopsis brevicaulis, Scopulariopsis fusca, Sporothrix schenckii, Botrytis cinera, Mucor plumbeus, Rhizopus stolonifer, Cladosporium cladosporioides, Cladosporium herbarum, Cladosporium sphaerospermum, Fusarium culmorum, Fusarium graminearum, Fusarium moniliforme, Fusarium solani, Fusarium sporotrichioides, Helminthosporium, Blastomyces dermatitidis, Rhodoturula glutinus, Rhodoturula minuta, Rhodoturula mucilaginosa, Alternaria alternata, Ulocladium botrytis, Ulocladium chartarum, Paracoccidioides brasiliensis, Epicoccum nigrum*, or combinations thereof.

Referring back to FIG. 2, the filtration layer of the present embodiment includes the fibers treated with one or more oligodynamic metal and/or salt of an oligodynamic metal 201 disbursed in a polymer 202. According to an embodiment, the filtration article includes multiple layers. For example, without limitation, a filtration article in accordance with an embodiment of the present invention includes an outmost layer which is a cover layer, a hydrophilic foam layer (comprising fibers treated with a metal or salt of a metal), a filtration media and a guard layer. The cover layer, foam layer, filtration media and guard layer can be of any suitable substance or substances as would be recognized by a person of skill in the art based upon the guidance provided herein. For example, without limitation, each layer may comprise a polymer or the like. One or more additional layers containing one or more additional antimicrobial agent, including one or more additional fiber treated with a metal and/or salt of a metal are contemplated in accordance with various embodiments of the present invention. Polymers suitable for use in the air permeable filtration layer can be hydrophobic polymers, hydrophilic polymers, or combinations thereof. Such polymers include, but are not limited to, polyurethane, polypropylene, polyvinylchloride, polyolefin, polyester, polyethylene oxide, polyamide, or combinations thereof. According to one embodiment, the filtration layer of the present invention includes a polyurethane hydrophilic foam. Hydrophilic foams that are suitable for use with the present invention are described in U.S. Pat. Application Publication Nos. 2003/0191204, 2003/0207954, 2003/0216483, and 2006/0234899, which are incorporated herein by reference. Suitable polymers could be readily prepared by persons of skill in the art based on the guidance provided herein. In a process according to an embodiment of the present invention, an outermost cover layer is constructed of approximately 20 gsm polypropylene to which a hydrophilic layer in which silver fibers are embedded is added; the foam layer is rolled onto another 20 gsm polypropylene layer (on the opposite side of the foam layer as the outer layer); next, a filtration media composed of dense polypropylene is added; and the final and innermost layer is a guard layer composed of polyester, polypropylene or a combination thereof.

The present invention contemplates that the filtration layer can additionally include one or more secondary antimicrobial substance. Suitable secondary antimicrobial substances can include antibacterial agents, antiviral agents, antimold agents, antiyeast agents, antifungal agents, or any combinations thereof, without intending to be limited thereto. A suitable secondary antimicrobial substances could be readily obtained or prepared by persons of skill in the art based on the guidance provided herein.

The present invention also provides methods of preparing an antimicrobial filtration article in accordance with various embodiments. According to an embodiment of the present invention, fibers are treated with one or more oligodynamic metal and/or salt of an oligodynamic metal. The method of treating the fibers with one or more oligodynamic metal and/or salt of an oligodynamic metal can include, but is not limited to, electroplating, electroless plating, vapor deposition, or combinations thereof. The treated fibers are incorporated into the filtration layer of a filtration article in accordance with various embodiments of the present invention.

According to an embodiment of the present invention, a method of producing a fiber treated with an oligodynamic metal is described in U.S. Pat. No. 4,042,737 and U.S. Pat. Application Publication No. 2003/0176827, which are hereby incorporated by reference. In accordance with this embodiment, a wet processing technique is used for treating fibers with an oligodynamic metal salt. The technique involves passing a substrate of a knitted fabric into a bath of a salt of the metal to be deposited together with a reducing agent for the metal component of the salt. According to an embodiment a treated fiber is prepared by the plating of silver onto a knitted nylon fabric from an aqueous bath of silver nitrate and formaldehyde. An example of one commercially available treated fiber is sold under the tradename X-STATIC, available from Noble Fiber Technologies of Scranton, Pa.

According to an embodiment of the present invention, a method of preparing a fiber treated with one or more oligodynamic metal and/or salt of an oligodynamic metal is through precipitating the one or more oligodynamic metal and/or salt of an oligodynamic metal onto a fiber. A person of skill in the art would readily be able to prepare a fiber treated with one or more oligodynamic metal and/or salt of an oligodynamic metal based on the guidance provided herein.

After the fibers are treated with one or more oligodynamic metal and/or salt of an oligodynamic metal, the fibers are incorporated into an air permeable filtration layer. According to an embodiment, the fibers are disbursed into a polymer while the polymer is in a liquid state. The polymer/fiber mixture can be mixed thoroughly to obtain an even disbursement of fibers in the polymer or the polymer/fiber mixture can be prepared in such a way that the fibers are concentrated into zones in the polymer. Once the polymer solidifies, the fibers are embedded in the polymer. Polymers suitable for use in the air permeable filtration layer can be hydrophobic polymers, hydrophilic polymers, or combinations thereof. Such polymers include, but are not limited to, polyurethane, polyvinylchloride, polyolefin, polyester, polyethylene oxide, polyamide, or combinations thereof. Additionally, the polymers can be made into a foam or other suitable air permeable forms.

According to one embodiment, the filtration layer of the present invention includes a polyurethane hydrophilic foam. Hydrophilic foams that are suitable for use with the present invention are described in U.S. Pat. Application Publication Nos. 2003/0191204, 2003/0207954, 2003/0216483, and 2006/0234899, which are incorporated herein by reference. Isocyanate-capped prepolymer is thoroughly mixed with an aqueous component, such as water, to form the polyurethane foam. The fibers treated with one or more oligodynamic metal and/or salt of an oligodynamic metal can be added and mixed into the prepolymer/water mixture while the mixture is still in the liquid state. The prepolymer/water/fiber mixture is allowed to set to form foam in the desired shape with the fibers treated with one or more oligodynamic metal and/or salt of an oligodynamic metal embedded in the foam. A person of skill in the art would readily be able to prepare a polymer suitable for use with the present invention based on the guidance provided herein.

After the air permeable filtration layer is prepared, the filtration layer is operatively associated with an air permeable support layer. According to one embodiment, the filtration layer is applied on a support layer. The present invention contemplates any suitable method for applying the air permeable filtration layer to the support layer, including the use of any suitable textile coating process, as would be readily available to a person of skill in the art using well known methods and techniques.

The filtration layer can have different configurations on the support layer depending on factors such as style, purpose, and manufacturing considerations of the filtration article. According to an embodiment, the entire support layer is coated with the filtration layer. In accordance with other various embodiments, one or more portions of the support layer are coated with the filtration layer. According to embodiments of the present invention, the filtration layer may form a pattern on the support layer or occupy various zones of with different characteristics, such as different concentrations of treated fibers, for example, without limitation.

The air permeable support layer associated with the filtration layer can be any woven type fabric, non-woven polymer, thermoplastic material, or combinations thereof. Suitable support layer materials include, but are not limited to, cotton, cellulose, polyester, polyolefin, polyamide, polypropylene, acrylic, and combinations thereof. A person of skill in the art would readily be able to prepare a support layer suitable for use with the present invention based on the guidance provided herein. In various embodiments, the present invention also contemplates the use of any suitable additives for achieving any desired characteristic of the articles. For example, without intending to be limited thereto, additives may be incorporated to provide thermal resistance, UV protection, and flame retardant characteristics. According to various embodiments, it is also contemplated that the filtration article of the present invention be made effective against one or more allergen, pollutant, toxin and the like, or combinations thereof. For example, one or more additional agent may be optionally incorporated to achieve or improve upon such effectiveness according to various embodiments of the present invention.

The final filtration article includes an attachment element and is configured to fit over the nose and mouth of a wearer. Any suitable attachment element is contemplated by the present invention as would be readily recognized by a person of skill in the art, based upon the guidance provided herein. The present invention is not limited to any particular style or configuration, and can include, but is not limited to, flatfold shape, cone shape or duckbill shape facemasks. Additionally, any suitable the attachment elements can be used to secure the filtration article to the face of a wearer. Examples of suitable attachment elements include, but are not limited to, hook and loop fasteners, buttons, ear loops, straps, or combinations thereof. The facemask according to the present invention may optionally incorporate other facemask features including, but not limited to, visors, shields, beard covers, or combinations thereof.

The foregoing aspects are exemplary only, and are not intended to limit the claimed invention. Other variations on the foregoing will be apparent to one of ordinary skill in the art after studying the present disclosure and practicing the inventions described herein.

EXAMPLES

The following are illustrative examples of the performance of the present embodiments. Although the examples utilize only selected tests, it should be understood that the following examples are illustrative and not limiting.

Example 1

*Klebsiella pneumoniae* Test Data

As shown in Test Data #1, an antimicrobial filtration layer of the present invention was tested against the bacteria *Klebsiella pneumoniae*. The filtration layer contained silver chloride treated fibers. The test was performed by NAMSA (Irvine, Calif.) according to ASTM E2149-01 entitled "Standard Test Method for Determining the Antimicrobial Activity of Immobilized Antimicrobial Agents Under Dynamic Contact Conditions". The test was performed to evaluate the antibacterial effectiveness against *Klebsiella pneumoniae*. After exposing the antimicrobial filtration layer to the bacteria for 4 hours, 99.99% of the bacteria were killed. The results of the study are illustrated in the following table.

| Test Data #1 | | | |
|---|---|---|---|
| | Organism Count (CFU/ml) | | |
| Sample Identification | Zero Time | 4 Hour | Percent Reduction |
| Filtration Layer | $2.00 \times 10^5$ | $1.00 \times 10^1$ | 99.99 |
| NAMSA *Klebsiella pneumoniae* Control | $2.00 \times 10^5$ | $2.36 \times 10^5$ | No Reduction |

As shown in the table, the test demonstrated the effectiveness of a filtration layer in accordance with an embodiment of the present invention against a bacterial pathogen.

Example 2

*Staphylococcus aureus* Test Data

As shown in Test Data #2, an antimicrobial filtration layer of the present invention was tested against the bacteria *Staphylococcus aureus* (MRSA). The filtration layer contained silver chloride treated fibers. The test was performed by NAMSA (Irvine, Calif.) according to ASTM E2149-01 entitled "Standard Test Method for Determining the Antimicrobial Activity of Immobilized Antimicrobial Agents Under Dynamic Contact Conditions". The test was performed to evaluate the anti-bacterial effectiveness against the stated bacteria. After exposing the antimicrobial filtration layer to the bacteria for 4 hours, greater than 99.99% of the bacteria were killed.

Test Data #2

| Sample Identification | Organism Count (CFU/ml) | | Percent Reduction |
|---|---|---|---|
| | Zero Time | 4 Hour | |
| Filtration Layer | $3.57 \times 10^5$ | $1.00 \times 10^1$ | >99.99 |
| NAMSA MRSA Control | $4.30 \times 10^5$ | $5.65 \times 10^5$ | No Reduction |

Example 3

H1N1 Influenza Virus Test Data

As shown in Test Data #3, the present invention was tested for antiviral effectiveness of the active ingredient. The testing was performed by Dr. Richard Webby at St. Jude Children's Research Hospital in Memphis, Tenn. The tested virus was H1N1 influenza virus in allantoic fluid. The test procedure used was as follows. Virus stocks were diluted 1/1000 in sterile PBS. 300 μl aliquots of virus dilution in microcentrifuge tubes were treated as follows. 30 μg of silver powder were added to Tubes A and B, 30 μg of silver flakes were added to Tubes C and D, and nothing was added to Tubes E and F. All tubes were incubated at room temperature (23° C.) for 10 minutes. After incubation tubes A and B were centrifuged at 13,000 rpm for 5 minutes and tubes C, D, E, and F were centrifuged at 13,000 rpm for 1 minute. All tubes were then placed on ice until processed. The amount of infectious virus particles remaining in solution was titrated by egg infectious dose 50 titrations ($EID_{50}$). Ten fold dilutions of solution were made in sterile PBS and 100 μl of each dilution injected into each of three 10-day-old embryonated chicken eggs. Eggs were incubated for 48 hours, chilled overnight, and then allantoic fluid was assayed for the presence of virus by hemagglutination with 0.5% chicken erythrocytes. $EID_{50}$ values were determined by the method of Reed and Meunch. Following the test protocol, it was found that the active ingredient killed greater than 99% of the H1N1 virus.

Test Data #3

| Active Ingredient | Infectious virus ($EID_{50}$) | Ave. Infectious virus ($EID_{50}$) | Percent Reduction From Control |
|---|---|---|---|
| Silver Powder | $1 \times 10^{6.25}$ | $1 \times 10^{6.99}$ | 99.1% |
| | $1 \times 10^{7.25}$ | | |
| Silver Flakes | $1 \times 10^{6.25}$ | $1 \times 10^{6.25}$ | 99.8% |
| | $1 \times 10^{6.25}$ | | |
| None - Control | $1 \times 10^{8.5}$ | $1 \times 10^{9.02}$ | — |
| | $1 \times 10^{9.25}$ | | |

Example 4

Bacterial Filtration Efficiency

As shown in Test Data #4, the present invention was tested for Bacterial Filtration Efficiency at Nelson Laboratories in Salt Lake City, Utah. The test was performed using the Andersen Sampler method using a mean particle size of 2.9 μm, and a challenge organism of the *Staphylococcus aureus*. The present invention achieved Bacterial Filtration Efficiency of greater than 99.9%, which greatly exceeds most commercially available masks.

Test Data #4

| Sample Identification | Percent BFE |
|---|---|
| Filtration Article - 1 | >99.9% |
| Filtration Article - 2 | >99.9% |
| Filtration Article - 3 | >99.9% |
| Filtration Article - 4 | >99.9% |
| Filtration Article - 5 | >99.9% |

Example 5

Viral Filtration Efficiency

As shown in Test Data # 5, the present invention was tested for Viral Filtration Efficiency at Nelson Laboratories in Salt Lake City, Utah. The test was performed using the Andersen Sampler method using a mean particle size of 2.9 μm, and a challenge organism of bacteriophage ΦX174. The present invention achieved Viral Filtration Efficiency of 99.9%, which greatly exceeds most commercially available masks.

Test Data #5

| Sample Identification | Percent BFE |
|---|---|
| Filtration Article - 1 | 99.9% |
| Filtration Article - 2 | >99.9% |
| Filtration Article - 3 | >99.9% |
| Filtration Article - 4 | >99.9% |
| Filtration Article - 5 | >99.9% |

This test demonstrated the effectiveness of a filtration layer in accordance with an embodiment of the present invention against a virus.

Example 6

Sodium Chloride Aerosol Test

As shown in Test Data # 6, the present invention was tested for Sodium Chloride Aerosol Tests for particle penetration at Nelson Laboratories in Salt Lake City, Utah. A neutralized, polydispersed aerosol of sodium chloride (NaCl) was generated with a TSI® CERTITEST® Model 8130 Automated Filter Tester and passed through test samples. The tester produces a particle size distribution with a count median diameter of 0.075±0.020 μm, and a standard geometric deviation not exceeding 1.86 μm. The mass median diameter is approximately 0.3 μm, which is found to be the most penetrating aerosol size. The filter test was filled with a 2% NaCl solution. The present invention achieved a particle penetration of less than one half of one percent on average, which makes the mask comparable to NIOSH N99 standards or better. This exceeds the standards of the majority of masks on the market.

| Test Data #6 | | |
| --- | --- | --- |
| Sample Identification | Airflow Resistance (mm H$_2$O) | Particle Penetration (%) |
| Filtration Article - 1 | 17.2 | 0.242 |
| Filtration Article - 2 | 17.2 | 0.687 |
| Filtration Article - 3 | 17.9 | 0.413 |
| Filtration Article - 4 | 19.0 | 0.563 |
| Filtration Article - 5 | 18.8 | 0.299 |

The embodiments have been described with reference to particular embodiments and examples. Those skilled in the art will appreciate that various modifications may be made to the embodiments without significantly departing from the spirit and scope thereof.

What is claimed is:

1. A method of preparing a filtration article comprising:
    treating fibers with one or more oligodynamic metal and/or salt of an oligodynamic metal,
    incorporating said fibers into an air permeable filtration layer, said filtration layer being operatively associated with an air permeable support layer configured to fit over the nose and mouth of a wearer.

2. The method of claim 1, wherein said one or more oligodynamic metal is silver, mercury, copper, iron, lead, zinc, bismuth, gold, aluminum, platinum, palladium, iridium, tin, antimony, or any combination thereof.

3. The method of claim 2, wherein said oligodynamic metal is silver.

4. The method of claim 1, wherein said fibers comprise polyesters, polyolefins, polyamides, polypropylenes, acrylics, cotton, cellulose, or any combination thereof.

5. The method of claim 1, wherein said fibers are about 0.3 mm to about 0.7 mm in diameter.

6. The method of claim 1, wherein said fibers are about 0.4 mm to about 0.6 mm in diameter.

7. The method of claim 1, wherein said fibers are about 0.5 mm in diameter.

8. The method of claim 1, wherein said filtration layer comprises a hydrophilic foam into which the oligodynamic metal treated fibers are disbursed.

9. The method of claim 1, further comprising treating the fibers with at least one secondary antimicrobial substance.

10. The method of claim 9, wherein the secondary antimicrobial substance is an antibacterial agent, an antiviral agent, an anti-mold agent, an anti-yeast agent, an antifungal agent, or any combination thereof.

11. The method of claim 1, wherein the filtration article is a facemask.

12. The method of claim 11, wherein said facemask has a cone shape, duckbill shape, or flatfold shape.

13. A method of preparing a filtration article comprising:
    treating fibers with silver or silver chloride;
    incorporating said fibers into an air permeable filtration layer comprising hydrophilic foam, wherein the concentration of said fibers in said filtration layer is between about 100 parts per million to about 2,000 parts per million and said fibers are about 0.5 mm in diameter; and
    operatively associating said filtration layer with an air permeable support layer and an attachment element, said support layer configured to fit over the nose and mouth of a wearer and said attachment element configured to secure said filtration article to the wearer.

* * * * *